United States Patent
Iizuka et al.

(10) Patent No.: US 10,107,186 B2
(45) Date of Patent: Oct. 23, 2018

(54) ACTUATOR POWER TRANSMISSION MECHANISM AND TURBOCHARGER

(71) Applicant: IHI Corporation, Koto-ku (JP)

(72) Inventors: Kuniaki Iizuka, Tokyo (JP); Masatoshi Eguchi, Tokyo (JP); Yasushi Asada, Tokyo (JP); Osamu Kagimoto, Tokyo (JP); Masashige Takahashi, Tokyo (JP); Hideumi Ohkuma, Tokyo (JP); Yohei Suruga, Tokyo (JP); Suguru Katayama, Tokyo (JP); Toshihiko Kitazawa, Tokyo (JP)

(73) Assignee: IHI Corporation, Koto-ku (JP)

(*) Notice: Subject to any disclaimer, the term of this patent is extended or adjusted under 35 U.S.C. 154(b) by 470 days.

(21) Appl. No.: 14/857,154

(22) Filed: Sep. 17, 2015

(65) Prior Publication Data

US 2016/0003138 A1    Jan. 7, 2016

Related U.S. Application Data

(63) Continuation of application No. PCT/JP2014/065441, filed on Jun. 11, 2014.

(30) Foreign Application Priority Data

Jul. 4, 2013    (JP) ................ 2013-141002

(51) Int. Cl.
  *F02B 37/24*    (2006.01)
(52) U.S. Cl.
  CPC ............. *F02B 37/24* (2013.01); *Y02T 10/144* (2013.01)
(58) Field of Classification Search
  CPC ...... F01D 17/105; F01D 17/165; F01D 17/20; F02B 37/24
  See application file for complete search history.

(56) References Cited

U.S. PATENT DOCUMENTS

| | | | | |
|---|---|---|---|---|
| 3,826,088 A | * | 7/1974 | Nash | C07D 277/587 60/766 |
| 5,799,953 A | * | 9/1998 | Henderson | F16J 15/3236 277/554 |

(Continued)

FOREIGN PATENT DOCUMENTS

| CN | 101864996 A | 10/2010 |
|---|---|---|
| JP | 61-70629 U | 5/1986 |

(Continued)

OTHER PUBLICATIONS

International Search Report dated Jul. 15, 2014 for PCT/JP2014/065441 filed on Jun. 11, 2014 with English Translation.

(Continued)

*Primary Examiner* — Woody Lee, Jr.
(74) *Attorney, Agent, or Firm* — Oblon, McClelland, Maier & Neustadt, L.L.P.

(57) ABSTRACT

An actuator power transmission mechanism includes: a first lever that rotates by power of an actuator; a drive shaft that has one end fixed to the first lever and rotates integrally with the first lever; one or more nozzle vanes that are directly or indirectly coupled to the other end side of the drive shaft, rotate interlocking with the drive shaft, and adjust an inclination angle with respect to a flow direction of a fluid; and a bearing that has an insertion hole through which the drive shaft is inserted, and that rotatably supports the drive shaft, and a suppression portion that suppresses infiltration of water that runs along an outer peripheral surface of the bearing into the insertion hole is provided at the outer peripheral surface of the bearing.

11 Claims, 4 Drawing Sheets

(56) References Cited

U.S. PATENT DOCUMENTS

| | | | |
|---|---|---|---|
| 7,080,510 B2 * | 7/2006 | Ishihara | F02B 37/183 |
| | | | 251/14 |
| 8,579,579 B2 * | 11/2013 | Castan | F01D 17/165 |
| | | | 415/160 |
| 8,684,677 B1 * | 4/2014 | Mann | F01D 17/165 |
| | | | 415/158 |
| 9,175,578 B2 * | 11/2015 | Igarashi | F01D 17/105 |
| 9,835,042 B2 * | 12/2017 | Mack | F01D 17/105 |
| 2005/0079049 A1 | 4/2005 | Ishihara et al. | |
| 2006/0213195 A1 * | 9/2006 | Leavesley | F02B 37/18 |
| | | | 60/605.1 |
| 2011/0000209 A1 | 1/2011 | Boening et al. | |
| 2013/0287552 A1 * | 10/2013 | House | F01D 11/003 |
| | | | 415/170.1 |

FOREIGN PATENT DOCUMENTS

| JP | 62-183032 U | 11/1987 |
|---|---|---|
| JP | 3-35203 U | 4/1991 |
| JP | 10-213102 A | 8/1998 |
| JP | 2002-349466 A | 12/2002 |
| JP | 2005-113797 A | 4/2005 |
| JP | 2005-180456 A | 7/2005 |
| JP | 2008-309111 A | 12/2008 |
| JP | 2011-513620 A | 4/2011 |
| JP | 2011-112020 A | 6/2011 |
| JP | 2013-053580 A | 3/2013 |

OTHER PUBLICATIONS

Written Opinion dated Jul. 15, 2014 for PCT/JP2014/065441 filed on Jun. 11, 2014.
Office Action dated Aug. 16, 2016 in Japanese Patent Application No. 2015-525119.
Combined Chinese Office Action and Search Report dated Mar. 17, 2017 in Patent Application No. 201480033070.5 (with English Translation of Categories of Cited Documents).

* cited by examiner

ACTUATOR POWER TRANSMISSION MECHANISM AND TURBOCHARGER

CROSS REFERENCE TO RELATED APPLICATIONS

This application is a continuation application of International Application No. PCT/JP2014/065441, filed on Jun. 11, 2014, which claims priority to Japanese Patent Application No. 2013-141002, filed on Jul. 4, 2013, the entire contents of which are incorporated by references herein.

BACKGROUND

1. Technical Field

The present disclosure relates to an actuator power transmission mechanism and a turbocharger which adjust an inclination angle with respect to a flow direction of a fluid.

2. Description of the Related Art

Conventionally, a variable geometry system turbine has been employed for a turbocharger etc. In such a turbine, for example, as shown in Japanese Patent Laid-Open Publication No. 10-213102 (Patent Literature 1), a plurality of nozzle vanes annularly aligned and arranged in a flow passage through which exhaust gas is guided from a scroll flow passage of a turbine side to a turbine wheel is fixed to a shaft (a blade shaft), respectively. The shaft is rotatably supported by a shaft hole formed in a flow passage wall surface. Additionally, when the nozzle vane changes its angle in the flow passage along with rotation of the shaft, a flow passage area changes, and a flow rate of a fluid that flows through the flow passage is controlled.

The above-described shaft rotates by power of an actuator. A power transmission mechanism is arranged between the actuator and the shaft, and the power of the actuator is converted into a force in a direction to rotate the shaft through the power transmission mechanism. The actuator is provided outside a housing of the turbocharger, and the power transmission mechanism has a bearing press-fitted into a through hole that penetrates the housing, and a drive shaft supported by the bearing, in order to transmit power to the shaft located inside the housing.

SUMMARY

As the actuator power transmission mechanism described in Patent Literature 1, when power is transmitted from the outside of the housing to the inside of the housing, the through hole that penetrates the housing is provided, and the bearing is press-fitted thereinto. Depending on amounting situation of the turbocharger, there is a fear that water infiltrates between the bearing and the drive shaft supported by the bearing. Further, when particular use conditions of an engine overlap, there has been a possibility that rust is generated to develop into a situation where the drive shaft and the bearing are firmly fixed to each other, trouble occurs in power transmission, etc., and thus durability of the actuator power transmission mechanism and the turbocharger having the actuator power transmission mechanism mounted thereon may be deteriorated.

Consequently, an object of the present disclosure is to provide an actuator power transmission mechanism and a turbocharger which are improved in durability.

A first aspect of the present disclosure is an actuator power transmission mechanism comprising: a rotary plate configured to rotate by power of an actuator; a drive shaft configured to rotate integrally with the rotary plate, one end of the drive shaft being fixed to the rotary plate; one or more adjusters directly or indirectly coupled to the other end side of the drive shaft, configured to rotate interlocking with the drive shaft to adjust an inclination angle with respect to a flow direction of a fluid; and a bearing provided with an insertion hole through which the drive shaft is inserted, and the bearing configured to rotatably support the drive shaft, wherein a suppression portion that suppresses infiltration of water that runs along an outer peripheral surface of the bearing into the insertion hole is provided at the outer peripheral surface of the bearing, wherein a part of the bearing is formed in a cylindrical shape that is press-fitted into a housing, and wherein the outer peripheral surface of the bearing is exposed between the housing and the rotary plate.

The suppression portion may include a bearing projection portion that projects in a radial direction of the drive shaft from the outer peripheral surface of the bearing.

The bearing projection portion may annularly extend over a peripheral direction of the drive shaft.

A groove that extends in the peripheral direction of the bearing may be formed in the outer peripheral surface of the bearing, and the bearing projection portion may be fitted in the groove.

A rotary plate projection portion that projects toward the other end side of the drive shaft, and is located outside in the radial direction of the drive shaft may be provided on the rotary plate.

At least a part of the bearing projection portion and a part of the rotary plate projection portion may overlap with each other seen from the radial direction of the drive shaft.

The bearing projection portion may have a cylindrical portion that abuts against the outer peripheral surface of the bearing, and a plate portion that is connected to the cylindrical portion and formed in a disk shape through which the bearing penetrates.

The bearing projection portion may further have a cylindrical portion whose outer diameter and inner diameter are larger than the cylindrical portion. In this case, the plate portion is provided between these cylindrical portions, and couples them to each other.

A second aspect of the present disclosure is a turbocharger including the above-described actuator power transmission mechanism.

According to the present disclosure, there can be provided the actuator power transmission mechanism and the turbocharger which are improved in durability.

DESCRIPTION OF THE EMBODIMENTS

Hereinafter, one embodiment of the present disclosure will be explained in detail with reference to accompanying drawings. Dimensions, materials, other specific numerical values, etc. shown in such an embodiment are merely exemplification for facilitating understanding of the disclosure, and they do not limit the present disclosure unless otherwise mentioned in advance. Note that in the specification and the drawings, duplicated explanation of elements having substantially the same functions and configurations is omitted by attaching the same symbols to the elements, and that illustration of elements having no direct relation to the present disclosure is also omitted.

Hereinafter, a turbocharger will be explained in which an actuator power transmission mechanism according to the embodiment is applied to a variable stator blade mechanism that adjusts a flow passage cross-sectional area of exhaust gas. However, an application range of the actuator power transmission mechanism according to the embodiment is not limited to this, and the actuator power transmission mechanism can be widely applied to a turbocharger in which power transmission of an actuator is performed. As another example to which the actuator power transmission mechanism according to the embodiment can be applied, there can be considered a turbocharger including a waste gate valve (an adjuster) that adjusts an inflow rate (an outflow rate) of exhaust gas to a bypass flow passage to bypass a turbine wheel, and a valve (an adjuster) that adjusts an inflow rate (an outflow rate) of a fluid to a bypass flow passage to bypass a compressor wheel.

In addition, the actuator power transmission mechanism according to the embodiment can also be applied to a turbocharger that opens and closes by an actuator a valve (an adjuster) that adjusts a flow rate of exhaust gas flowing into turbochargers of an upstream stage and a downstream stage, in a multistage turbocharger in which the plurality of turbochargers is continuously installed. Further, the actuator power transmission mechanism according to the embodiment can also be applied to a turbocharger including a valve (an adjuster) that adjusts an inflow ratio of exhaust gas to two scroll flow passages, in a twin scroll type turbocharger in which a flow of the exhaust gas branches into the two scroll flow passages. Furthermore, the actuator power transmission mechanism according to the embodiment can also be applied as a power transmission mechanism that transmits power of an actuator mounted not only on the turbocharger but on another apparatus.

Here, first, a configuration of a turbocharger including an actuator power transmission mechanism will be explained, and subsequently, a configuration of the actuator power transmission mechanism of the embodiment will be specifically explained.

Figure 1:
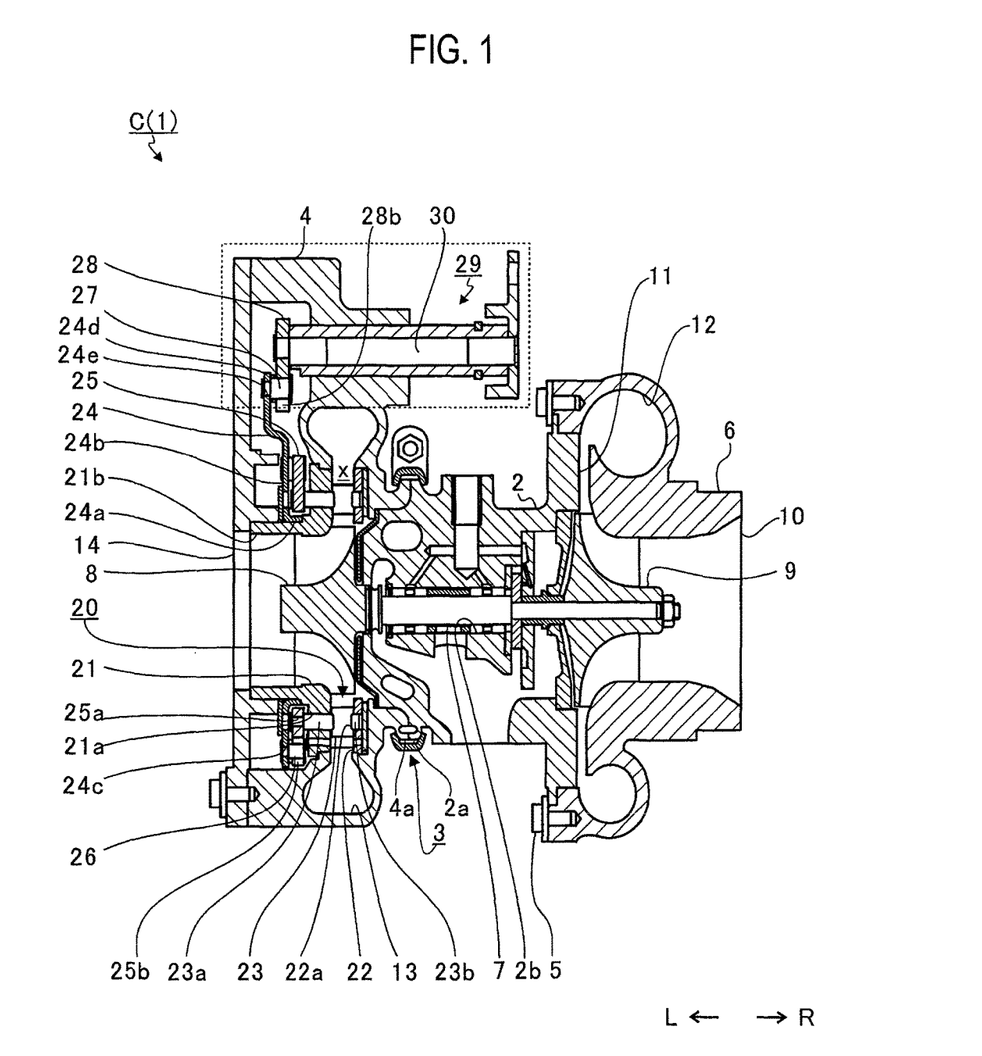
FIG. 1 is a schematic cross-sectional view showing a turbocharger according to one embodiment of the present disclosure.

FIG. 1 is a schematic cross-sectional view of a turbocharger C. Hereinafter, explanation will be made, setting an arrow L direction shown in FIG. 1 as a left side of the turbocharger C, and an arrow R direction as a right side thereof. As shown in FIG. 1, the turbocharger C is configured to include a turbocharger body 1. The turbocharger body 1 is formed by integration of a bearing housing 2, a turbine housing 4 coupled to a left side of the bearing housing 2 by a fastening mechanism 3, and a compressor housing 6 coupled to a right side of the bearing housing 2 by a fastening bolt 5.

A projection 2a is provided on an outer peripheral surface near the turbine housing 4 of the bearing housing 2. The projection 2a projects in a radial direction of the bearing housing 2. In addition, a projection 4a is provided on an outer peripheral surface near the bearing housing 2 of the turbine housing 4. The projection 4a projects in a radial direction of the turbine housing 4. The bearing housing 2 and the turbine housing 4 are fixed to each other by fastening the projections 2a and 4a using a band by the fastening mechanism 3. The fastening mechanism 3 includes coupling (so-called G coupling) that sandwiches the projections 2a and 4a.

A hole (a bearing hole) 2b that penetrates in a horizontal direction of the turbocharger C is formed in the bearing housing 2. A turbine shaft 7 is inserted in the hole 2b, and is rotatably supported through the bearing. A turbine wheel 8 is integrally coupled to one end of the turbine shaft 7. The turbine wheel 8 is rotatably housed in the turbine housing 4. In addition, a compressor wheel 9 is integrally coupled to the other end of the turbine shaft 7. The compressor wheel 9 is rotatably housed in the compressor housing 6.

An intake port 10 is formed in the compressor housing 6. The intake port 10 is opened on the right side of the turbocharger C, and is connected to an air cleaner (not shown). In addition, in a state where the bearing housing 2 and the compressor housing 6 are coupled to each other by the fastening bolt 5, facing surfaces of the both housings 2 and 6 form a diffuser flow passage 11 in which a pressure of the fluid is raised. The diffuser flow passage 11 is annularly formed from an inside toward an outside in a radial direction of the turbine shaft 7 (compressor wheel 9), and communicates with the intake port 10 through the compressor wheel 9 in the above-described inside in the radial direction.

In addition, a compressor scroll flow passage 12 is provided in the compressor housing 6. The compressor scroll flow passage 12 is located closer to the outside in the radial direction of the turbine shaft 7 (compressor wheel 9) than the diffuser flow passage 11, and is annularly formed. The compressor scroll flow passage 12 communicates with an intake port of an engine (not shown). In addition, the compressor scroll flow passage 12 also communicates with the diffuser flow passage 11. Accordingly, when the compressor wheel 9 rotates, the fluid is sucked into the compressor housing 6 from the intake port 10, and a pressure of the sucked fluid is raised in the diffuser flow passage 11 and the compressor scroll flow passage 12, and is guided to the intake port of the engine.

A turbine scroll flow passage 13 is provided in the turbine housing 4. The turbine scroll flow passage 13 is located closer to the outside in the radial direction of the turbine shaft 7 than the turbine wheel 8, and is annularly formed. A nozzle vane (mentioned later) 23 is arranged between the turbine wheel 8 and the turbine scroll flow passage 13 to thereby configure a variable flow passage x through which the fluid flows. The variable flow passage x is annularly formed from the inside toward the outside in the radial direction of the turbine shaft 7 (turbine wheel 8).

In addition, a discharge port 14 is formed in the turbine housing 4. The discharge port 14 communicates with the turbine scroll flow passage 13 through the turbine wheel 8. In addition, the discharge port 14 faces the front of the turbine wheel 8, and is connected to an exhaust gas purification apparatus (not shown).

The turbine scroll flow passage 13 communicates with a gas inflow port (not shown) to which exhaust gas discharged from the engine is guided. In addition, the turbine scroll flow passage 13 communicates also with the above-described variable flow passage x. Accordingly, the exhaust gas is guided from the gas inflow port to the turbine scroll flow passage 13, and is subsequently guided to the discharge port 14 through the variable flow passage x and the turbine wheel 8. In this flow process, the exhaust gas rotates the turbine wheel 8. A rotational force of the turbine wheel 8 is transmitted to the compressor wheel 9 through the turbine shaft 7. The pressure of the fluid is raised by the transmitted rotational force of the compressor wheel 9, and then the fluid is guided to the intake port of the engine.

At this time, when a flow rate of the exhaust gas guided to the turbine housing 4 changes, rotational amounts of the turbine wheel 8 and the compressor wheel 9 change. Depending on an operation situation of the engine, there is a case where the desired fluid with the raised pressure cannot be sufficiently guided to the intake port of the engine. Consequently, a variable stator blade mechanism 20 that adjusts a communication opening degree between the turbine scroll flow passage 13 and the discharge port 14 is provided in the variable flow passage x of the turbine housing 4.

The variable stator blade mechanism 20 changes a flow velocity of the exhaust gas guided to the turbine wheel 8 according to the flow rate of the exhaust gas. Specifically, when a rotational speed of the engine is low, and the flow rate of the exhaust gas is small, the variable stator blade mechanism 20 reduces an opening degree of the variable flow passage x to increase the flow velocity of the exhaust gas guided to the turbine wheel 8. As a result of this, the turbine wheel 8 can be rotated even by a small flow rate. Hereinafter, a configuration of the variable stator blade mechanism 20 will be explained.

As shown in FIG. 1, the variable stator blade mechanism 20 includes a shroud plate 21 that forms a wall surface of a left side of the variable flow passage x, and a facing plate 22 that forms a wall surface of a right side thereof. The shroud plate 21 and the facing plate 22 are annular members, respectively, and face to each other in the axial direction of the turbine shaft 7. Namely, a gap between the shroud plate 21 and the facing plate 22 in the axial direction in the turbine shaft 7 configures the variable flow passage x.

In addition, the shroud plate 21 has an annular cylindrical portion 21b that extends from a flange portion that faces the facing plate 22 toward the discharge port 14. A portion that continues from the flange portion to the cylindrical portion 21b is formed as a shroud wall that faces an outside in a radial direction of the turbine wheel 8.

A hole (a shroud hole) 21a that penetrates in the axial direction of the turbine shaft 7 is formed in the shroud plate 21. A hole (a facing hole) 22a that penetrates in the axial direction of the turbine shaft 7 is formed in a position that faces the hole 21a in the facing plate 22. The plurality of holes 21a and the plurality of holes 22a are arranged at regular intervals in a peripheral direction of the turbine shaft 7, respectively.

The nozzle vane 23 (adjuster) is a member whose length in the axial direction in the turbine shaft 7 is slightly shorter than an interval of the variable flow passage x in the axial direction in the turbine shaft 7, and the nozzle vane 23 has two shafts (blade shafts) 23a and 23b. The shafts 23a and 23b are rotatably supported in the hole 21a of the shroud plate 21 and the hole 22a of the facing plate 22, respectively.

The plurality of nozzle vanes 23 is arranged in the variable flow passage x one by one for each hole 21a (hole 22a).

A drive ring 24 is arranged outside in a radial direction of the cylindrical portion 21b of the shroud plate 21. The drive ring 24 has an annular cylindrical portion 24a. In the drive ring 24, an inner peripheral surface of the cylindrical portion 24a faces an outer peripheral surface of the cylindrical portion 21b of the shroud plate 21 in the radial direction. Namely, the cylindrical portion 21b of the shroud plate 21 is inserted in the cylindrical portion 24a of the drive ring 24, and the drive ring 24 can rotate relatively to the shroud plate 21.

Figure 2:
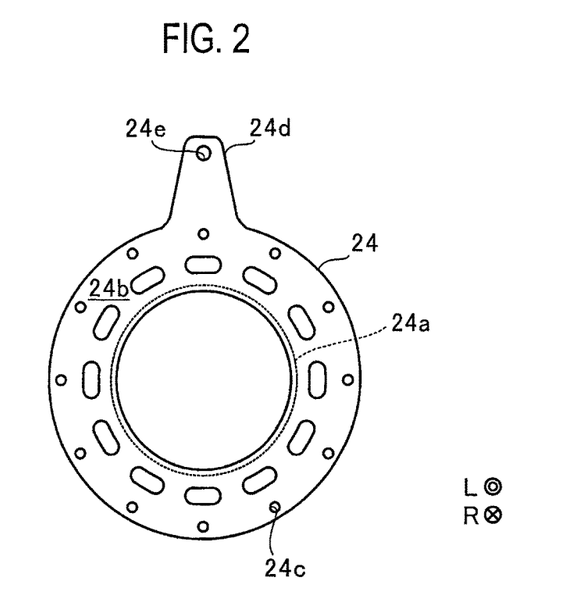
FIG. 2 is a plan view of a drive ring seen from a left side of FIG. 1.

FIG. 2 is a plan view of the drive ring 24 seen from a left side of FIG. 1. As shown in FIG. 2, the drive ring 24 has an annular flange portion 24b with an outer diameter larger than the cylindrical portion 24a. The flange portion 24b extends from an end to an outside in a radial direction of the cylindrical portion 24a, and a plurality of holes (ring holes) 24c is formed at equal intervals in a peripheral direction of the flange portion 24b.

In addition, a projection portion 24d that projects in a radial direction of the drive ring 24 is formed on an upper side of the drive ring 24 in FIG. 2. A hole (a ring hole) 24e that penetrates in the axial direction of the turbine shaft 7 is formed in the projection portion 24d.

As shown in FIG. 1, a coupling member 25 is arranged in a gap between the flange portion 24b and the drive ring 24 of the shroud plate 21 in the axial direction in the turbine shaft 7. The plurality of coupling members 25 is arranged in a peripheral direction of the cylindrical portion 24a of the drive ring 24.

Figure 3:
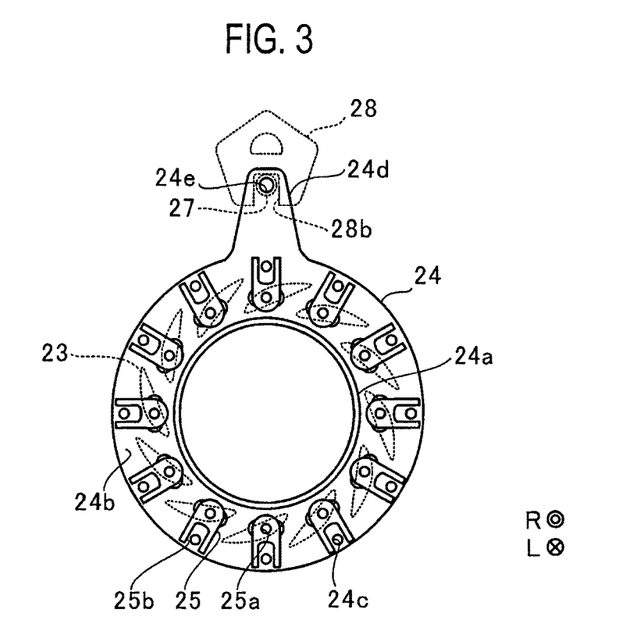
FIG. 3 is a plan view of the drive ring and a coupling member seen from a right side of FIG. 1.

FIG. 3 is a plan view of the drive ring 24 and the coupling members 25 seen from a right side of FIG. 1. As shown in FIG. 3, the coupling member 25 is a so-called U-shaped (Y-shaped) member having two arms. A hole (a coupling hole) 25a that penetrates in the axial direction of the turbine shaft 7 is formed in the coupling member 25. One end of the shaft 23a (refer to FIG. 1) is inserted in the hole 25a from the right side, and is fixed thereto.

The coupling member 25 is arranged so that one end side in which the hole 25a has been formed faces an inside in the radial direction of the cylindrical portion 24a of the drive ring 24. A coupling pin 26 (refer to FIG. 1) is located in a gap 25b between branched two portions (arms) of the other end side of the coupling member 25. One end of the coupling pin 26 is inserted in the hole 24c.

When the drive ring 24 rocks in the peripheral direction of the cylindrical portion 24a, the coupling pin 26 inserted in the hole 24c comes into contact with the coupling member 25. As described above, the shaft 23a is fixed to the hole 25a of the coupling member 25. In addition, the shaft 23a is rotatably supported by the hole 21a and the hole 22a. Therefore, when the coupling pin 26 abuts against the coupling member 25, and further rocks in the same direction, the coupling member 25 is pushed by the coupling pin 26, and rotates around the shaft 23a. The shaft 23a fixed to the hole 25a of the coupling member 25 then interlockingly rotates, and an inclination angle of the nozzle vane 23 with respect to a flow direction of the fluid changes. That is, the inclination angle of the nozzle vane 23 with respect to the flow direction is variable.

In addition, as shown in FIG. 1, one end of a projection pin 27 is inserted in the hole 24e of the drive ring 24 from the right side. An interlocking plate 28 is arranged on a right side of the projection portion 24d of the drive ring 24. The other end of a drive shaft 30 constituting a power transmission mechanism 29 is inserted in the interlocking plate 28, and the interlocking plate 28 rotates integrally with the drive shaft 30.

As shown by a broken line in FIG. 3, the interlocking plate 28 has a notch formed on a lower side thereof in FIG. 3. The projection pin 27 is located in a gap 28b of the notch portion. Additionally, when the interlocking plate 28 rotates along with rotation of the drive shaft 30, the projection pin 27 is pushed by the interlocking plate 28, and then rocks. Interlockingly with the rocking, the projection pin 27 rocks the fixed drive ring 24. Meanwhile, the cylindrical portion 24a of the drive ring 24 is inserted in the hole 21a of the shroud plate 21. Therefore, the drive ring 24 rotates in the peripheral direction of the cylindrical portion 24a. As a result, as described above, the nozzle vane 23 rotates around the shaft 23a through the coupling member 25.

Figure 4:
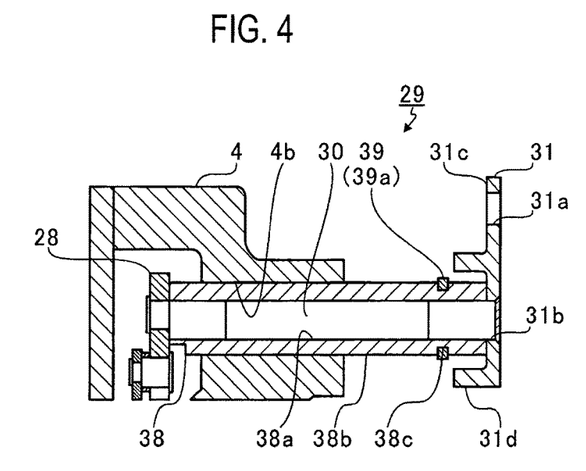
FIG. 4 is an explanatory view for explaining a power transmission mechanism.

FIG. 4 is an explanatory view for explaining the power transmission mechanism 29, and is an extraction view of a broken-line portion of FIG. 1. As shown in FIG. 4, the power transmission mechanism 29 has a first lever 31 (a rotary plate) to which the other end of the drive shaft 30 has been fixed. A lever hole 31a that penetrates in an axial direction of the drive shaft 30 is formed in one end side of the first lever 31, and a drive hole 31b that penetrates in the axial direction of the drive shaft 30 is formed in the other end side thereof. One end of the drive shaft 30 is inserted in the drive hole 31b from a left side, is welded and blocked from a right side, and thereby the one end of the drive shaft 30 is fixed to the first lever 31. Namely, the first lever 31 rotates integrally with the drive shaft 30.

Figure 5A:
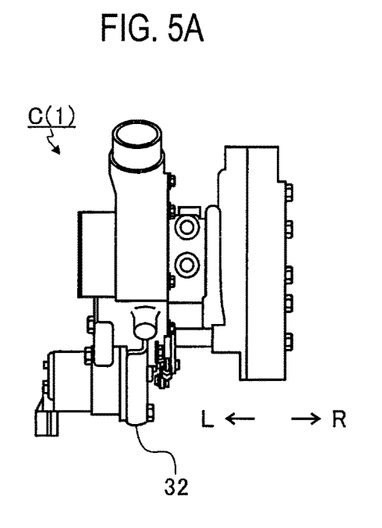
FIGS. 5A and 5B are external views of the turbocharger.
Figure 5B:
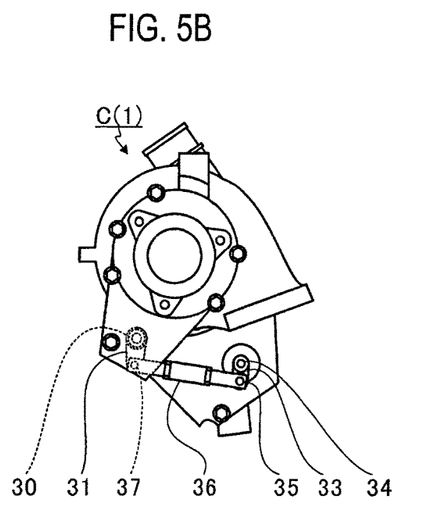

FIG. 5 is an external view of the turbocharger C, an elevational view of the turbocharger C is shown in FIG. 5A, and a right side view thereof is shown in FIG. 5B. As shown in FIG. 5A, an actuator 32 is provided outside the housing in the turbocharger C.

The actuator 32 includes a motor etc., and rotates a fixed shaft 34 fixed to one end of a second lever 33 shown in FIG. 5B according to control of a controller (not shown). One end of a rod 36 is rotatably coupled to the other end of the second lever 33 through a movable shaft 35. The other end of the rod 36 and the first lever 31 are rotatably coupled to each other through a movable shaft 37. In addition, the movable shaft 37 is inserted in the above-described lever hole 31a.

Additionally, power of the actuator 32 is transmitted to the first lever 31 through the second lever 33, the fixed shaft 34, the movable shaft 35, the rod 36, and the movable shaft 37, and the first lever 31 rotates around the drive shaft 30. Since the first lever 31 is fixed to the one end of the drive shaft 30, the drive shaft 30 also rotates when the first lever 31 rotates by the power of the actuator 32. As a result, the nozzle vane 23 changes its angle in the variable flow passage x along with rotation of the shaft 23a as described above.

In other words, the nozzle vane 23 is indirectly coupled to the other end side of the drive shaft 30, and rotates interlockingly with the drive shaft 30, and the inclination angle of the nozzle vane 23 with respect to the flow direction of the fluid changes. In this way, an area of the variable flow passage x changes.

As shown in FIG. 4, a bearing 38 is formed in a cylindrical shape having a longitudinal direction. The bearing 38 has an insertion hole 38a that extends in the longitudinal direction. The drive shaft 30 is inserted in the insertion hole 38a, and the bearing 38 rotatably supports the drive shaft 30. A hole (a housing hole) 4b is formed in the turbine housing 4. The hole 4b penetrates the turbine housing 4 in the axial direction of the turbine shaft 7. A part of the bearing 38 is press-fitted into and fixed to the hole 4b, and a remaining part thereof is exposed outside from the turbine housing 4. Namely, an outer peripheral surface (mentioned later) 38b of the bearing 38 is exposed between the turbine housing 4 and the first lever 31.

There is a fear that water infiltrates between the bearing 38 and the drive shaft 30 depending on a mounting situation of the turbocharger C. Further, when particular use conditions of the engine overlap, there is a possibility that rust is generated, and that the drive shaft 30 and the bearing 38 are firmly fixed to each other due to the rust, and durability may be deteriorated. Consequently, a suppression portion 39 that suppresses infiltration of water that runs along the outer peripheral surface 38b of the bearing 38 into the insertion hole 38a is provided at the outer peripheral surface 38b of the bearing 38.

The suppression portion 39 includes a bearing projection portion 39a that projects in a radial direction of the drive shaft 30 from the outer peripheral surface 38b of the bearing 38. An annular groove 38c is formed in the outer peripheral surface 38b of the bearing 38. The groove 38c is depressed inside in a radial direction of the bearing 38. In addition, the groove 38c extends in a peripheral direction of the bearing 38. Meanwhile, the bearing projection portion 39a includes an annular member that annularly extends over a peripheral direction of the drive shaft 30. The bearing projection portion 39a is fitted in the groove 38c.

An inner diameter of the bearing projection portion 39a is larger than an outer diameter of the groove 38c. An outer diameter of the bearing projection portion 39a is larger than an outer diameter of the bearing 38. Here, for example, a notch is formed in a part of the bearing projection portion 39a so that the bearing projection portion 39a is easily attached to the groove 38c.

The suppression portion 39 suppresses progress of water that runs along the bearing 38 from the turbine housing 4 and goes toward a right side in FIG. 4. Further, the suppression portion 39 suppresses infiltration of water from a gap between the bearing 38 and the first lever 31 to a gap between the insertion hole 38a of the bearing 38 and the drive shaft 30. Therefore, generation of rust is suppressed, and durability of the turbocharger C and the power transmission mechanism 29 can be improved.

In addition, since the suppression portion 39 includes the bearing projection portion 39a that projects in the radial direction of the drive shaft 30 from the outer peripheral surface 38b of the bearing 38, the power transmission mechanism 29 has simple structure, and is easily designed.

In addition, since the bearing projection portion 39a annularly extends over the peripheral direction of the drive shaft 30, it becomes possible to prevent the progress of water by the bearing projection portion 39a, even if water runs from any position in the peripheral direction of the outer peripheral surface 38b of the bearing 38. Further, water that runs along the outer peripheral surface 38b of the bearing 38 runs along a groove bottom of the groove 38c, and is guided vertically downward along the groove 38c. As described above, it becomes possible to prevent the progress of water to the gap between the insertion hole 38a of the bearing 38 and the drive shaft 30 also by the groove 38c.

In addition, since the bearing projection portion 39a is made as an annular member fitted in the groove 38c, processing of the bearing 38 becomes easier compared with a case where the outer peripheral surface 38b of the bearing 38 is cut out to form the bearing projection portion.

In addition, a rotary plate projection portion 31d is provided on the first lever 31. The rotary plate projection portion 31d projects in the axial direction toward the other end side of the drive shaft 30, and is located outside in the radial direction of the drive shaft 30. Therefore, even in a case where water runs along the first lever 31, and goes toward the gap between the insertion hole 38a of the bearing 38 and the drive shaft 30, or where dispersed water directly goes toward the gap between the bearing 38 and the drive shaft 30, progress of water can be prevented by the rotary plate projection portion 31d. Namely, it becomes possible to suppress the progress of water that goes toward the gap between the insertion hole 38a and the drive shaft 30 from any direction by installing the rotary plate projection portion 31d together with the suppression portion 39.

FIG. 6 is an explanatory view for explaining power transmission mechanisms 29a to 29d as modified examples of the embodiment. The power transmission mechanism 29a of a first modified example shown in FIG. 6A has a suppression portion 49 including a bearing projection portion 49a. The bearing projection portion 49a is an annular member, and has a small diameter portion (a cylindrical portion) 49b in which the bearing 38 is inserted and which abuts against the outer peripheral surface 38b of the bearing 38, and a large diameter portion (a cylindrical portion) 49c that is continuously formed on the first lever 31 side from the small diameter portion 49b, and has a larger outer diameter and inner diameter than the small diameter portion 49b. In other words, the small diameter portion (cylindrical portion) 49b and the large diameter portion (cylindrical portion) 49c are coupled to each other by a plate portion (a coupling member) 49d provided therebetween. The plate portion 49d is formed in a disk shape through which the bearing 38 penetrates. The plate portion 49d is connected to the small diameter portion 49b in an inner end in a radial direction of the plate portion 49d. In addition, the plate portion 49d is connected to the large diameter portion 49c in an outer end in the radial direction of the plate portion 49d.

Figure 6A:
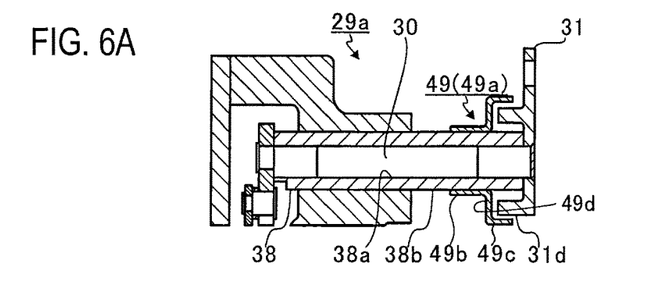
FIGS. 6A to 6D are explanatory views for explaining power transmission mechanisms as modified examples of the embodiment.

The inner diameter of the large diameter portion 49c is larger than an outer diameter of the rotary plate projection portion 31d of the first lever 31. A tip side of the rotary plate projection portion 31d is located inside in a radial direction of the large diameter portion 49c. Namely, at least a part of the bearing projection portion 49a and a part of the rotary plate projection portion 31d overlap with each other seen from the radial direction of the drive shaft 30. Note that mutually overlapping portions in the bearing projection portion 49a and the rotary plate projection portion 31d may be spaced apart from each other at a predetermined interval or may be in contact with each other in the radial direction of the drive shaft 30.

As described above, the bearing projection portion 49a and the rotary plate projection portion 31d are arranged so as to overlap with each other, and thereby the rotary plate projection portion 31d prevents progress of water to an inside of the bearing 38, even if the water reaches an end of the first lever 31 side of the large diameter portion 49c of the bearing projection portion 49a.

Here, a case has been explained where the large diameter portion 49c of the bearing projection portion 49a is located outside in a radial direction of the rotary plate projection portion 31d. However, the rotary plate projection portion 31d may be located outside in the radial direction of the large diameter portion 49c of the bearing projection portion 49a. In this case, even if water reaches a tip portion in a projection direction of the rotary plate projection portion 31d, progress of the water to the inside of the bearing 38 can be prevented by the large diameter portion 49c of the bearing projection portion 49a.

Note that the large diameter portion 49c may be omitted according to structure of the first lever 31 (for example, in a case where the rotary plate projection portion 31d is omitted), a use environment of the power transmission mechanism 29a, etc. In this case, the suppression portion 49 has only the small diameter portion 49b, and the plate portion 49d coupled to one end of the small diameter portion 49b.

Figure 6B:
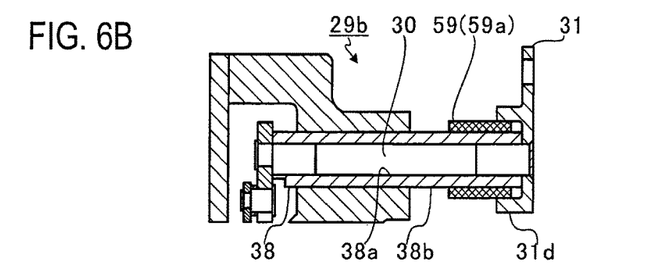

In addition, the power transmission mechanism 29b of a second modified example shown in FIG. 6B has a suppression portion 59 including a bearing projection portion 59a. The bearing projection portion 59a is stainless steel wool or glass wool wound around the outer peripheral surface 38b of the bearing 38. The gap between the rotary plate projection portion 31d and the outer peripheral surfaces 38b of the bearing 38 is filled, or the gap is narrowed, thereby the bearing projection portion 59a can prevent progress of water to the inside of the bearing 38.

Figure 6C:
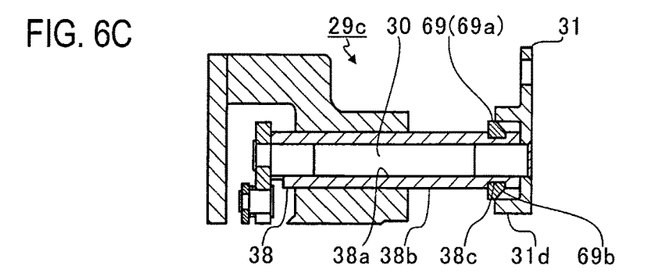

In addition, the power transmission mechanism 29c of a third modified example shown in FIG. 6C has a suppression portion 69 including a bearing projection portion 69a. Although the bearing projection portion 69a includes an annular member fitted in the groove 38c similarly to the above-mentioned embodiment, an inclined surface 69b is formed on the first lever 31 side. The inclined surface 69b is the surface whose outer diameter becomes larger as it is separated more from the first lever 31 side in the axial direction of the drive shaft 30, and is located inside in the radial direction of the rotary plate projection portion 31d. A maximum outer diameter of the bearing projection portion 69a is set to be a dimension fitted to an inner peripheral side of the rotary plate projection portion 31d, which makes it possible to prevent progress of water to the inside of the bearing 38. Further, even if water infiltrates into the inner peripheral side of the rotary plate projection portion 31d, the inclined surface 69b guides the water in a direction (a left side in FIG. 3(c)) separated from the first lever 31 side, in a position closer to a vertically lower side than a center position in a radial direction of the bearing projection portion 69a. Therefore, water easily goes out.

Additionally, since the bearing projection portion 69a is fitted to the inner peripheral side of the rotary plate projection portion 31d, the progress of water to the inside of the bearing 38 can be prevented.

Figure 6D:
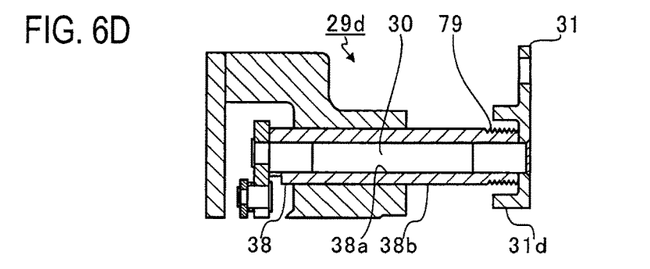

In addition, the power transmission mechanism 29d of a fourth modified example shown in FIG. 6D has a suppression portion 79. The suppression portion 79 is a thread groove formed in the outer peripheral surface 38b in an end of the first lever 31 side of the bearing 38, and is located inside in the radial direction of the rotary plate projection portion 31d. As described above, by a configuration of providing the suppression portion 79, it is possible to guide water that runs along the bearing 38 vertically downward along the thread groove, and to prevent progress of the water to the inside of the bearing 38.

Here, although a case has been explained where the suppression portion 79 includes the thread groove formed in the outer peripheral surface 38b of the bearing 38, the suppression portion may be one or more annular grooves formed in the outer peripheral surface 38b of the bearing 38.

In addition, although in the above-mentioned embodiment, a case has been explained where the bearing projection portion 39a is the annular member fitted in the groove 38c, the bearing projection portion may be an annular projection integrally formed on the outer peripheral surface 38b of the bearing 38.

In addition, although in the above-mentioned embodiment and modified examples, a case has been explained where the adjuster (nozzle vane 23) is indirectly coupled to the drive shaft 30 through the plurality of members, the adjuster may be directly coupled to the drive shaft 30.

In addition, the power transmission mechanisms 29, and 29a to 29d of the actuator 32 of the above-mentioned embodiment and modified examples may be applied to an actuator power transmission mechanism that adjusts an opening degree of a waste gate valve of a turbocharger.

In addition, the power transmission mechanisms 29, and 29a to 29d of the actuator 32 of the above-mentioned embodiment and modified examples may be applied to an actuator power transmission mechanism that adjusts an opening degree of a valve that adjusts a flow rate of exhaust gas flowing into turbochargers of an upstream stage and a downstream stage, in a multistage turbocharger in which a plurality of turbochargers is continuously installed.

In addition, the power transmission mechanisms 29, and 29a to 29d of the actuator 32 of the above-mentioned embodiment and modified examples may be applied to an actuator power transmission mechanism that adjusts an opening degree of a valve that adjusts an inflow ratio of exhaust gas to two scroll flow passages, in a twin scroll type turbocharger in which a flow of the exhaust gas branches into the two scroll flow passages.

Even in any case, a valve body of the valve corresponds to the above-mentioned adjuster (nozzle vane 23). In addition, a bearing press-fitted into a through hole provided in a turbine housing corresponds to the above-mentioned bearing 38. A stem supported by the bearing corresponds to the above-mentioned drive shaft 30. A link plate that is coupled to an end of the stem projecting outside the turbine housing, and is rotated by power of an actuator corresponds to the above-mentioned rotary plate (first lever 31).

Hereinbefore, although the preferred embodiment of the present disclosure has been explained with reference to the accompanying drawings, it is needless to say that the present disclosure is not limited to such an embodiment. It is apparent that those skilled in the art can conceive various modified examples or correction examples in a category described in claims, and they are understood to naturally belong to the technical scope of the present disclosure.

What is claimed is:

1. An actuator power transmission mechanism comprising:
    a rotary plate configured to rotate by power of an actuator;
    a drive shaft configured to rotate integrally with the rotary plate, one end of the drive shaft being fixed to the rotary plate;
    one or more adjusters directly or indirectly coupled to the other end side of the drive shaft, configured to rotate interlocking with the drive shaft to adjust an inclination angle with respect to a flow direction of a fluid; and
    a bearing provided with an insertion hole through which the drive shaft is inserted, and the bearing configured to rotatably support the drive shaft,
    wherein a suppression portion that suppresses infiltration of water that runs along an outer peripheral surface of the bearing into the insertion hole is provided at the outer peripheral surface of the bearing,
    wherein a part of the bearing is formed in a cylindrical shape that is press-fitted into a housing,
    wherein the outer peripheral surface of the bearing is exposed between the housing and the rotary plate, and
    wherein a rotary plate projection portion is provided on the rotary plate, is located outside in a radial direction of the drive shaft, and projects toward the other end side of the drive shaft.

2. The actuator power transmission mechanism according to claim 1, wherein the suppression portion includes a bearing projection portion that projects in the radial direction of the drive shaft from the outer peripheral surface of the bearing.

3. The actuator power transmission mechanism according to claim 2, wherein the bearing projection portion annularly extends over a peripheral direction of the drive shaft.

4. The actuator power transmission mechanism according to claim 3,
    wherein a groove that extends in a peripheral direction of the bearing is formed in the outer peripheral surface of the bearing, and
    wherein the bearing projection portion is fitted in the groove.

5. The actuator power transmission mechanism according to claim 2, wherein
    the bearing projection portion has:
    a cylindrical portion that abuts against the outer peripheral surface of the bearing; and
    a plate portion that is connected to the cylindrical portion and formed in a disk shape through which the bearing penetrates.

6. The actuator power transmission mechanism according to claim 5,
    wherein the bearing projection portion further has a cylindrical portion whose outer diameter and inner diameter are larger than the cylindrical portion, and
    wherein the plate portion is provided between these cylindrical portions, and couples them to each other.

7. The actuator power transmission mechanism according to claim 1, wherein at least a part of a bearing projection portion and a part of the rotary plate projection portion overlap with each other seen from the radial direction of the drive shaft.

8. A turbocharger comprising an actuator power transmission mechanism according to claim 1.

9. The actuator power transmission mechanism according to claim 2, wherein the bearing projection portion is stainless steel wool or glass wool wound around the outer peripheral surface of the bearing.

10. The actuator power transmission mechanism according to claim 2, wherein the bearing projection portion includes an inclined surface formed on a rotary plate side of the bearing projection portion, the inclined surface has an outer diameter which increases as the inclined surface separates from the rotary plate in an axial direction of the drive shaft, and a part of the inclined surface is located inside the rotary plate projection portion in the radial direction of the drive shaft.

11. The actuator power transmission mechanism according to claim 1, wherein the suppression portion is a thread groove or at least one annular groove formed in the outer peripheral surface of the bearing.

* * * * *